(12) United States Patent
Yang et al.

(10) Patent No.: US 8,154,863 B2
(45) Date of Patent: Apr. 10, 2012

(54) DATA STORAGE DEVICE ASSEMBLY

(75) Inventors: Xu Yang, Shenzhen (CN); Zhan-Yang Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 263 days.

(21) Appl. No.: 12/715,650

(22) Filed: Mar. 2, 2010

(65) Prior Publication Data

US 2011/0141680 A1   Jun. 16, 2011

(30) Foreign Application Priority Data

Dec. 11, 2009  (CN) .................... 2009 2 0317163 U (51) Int. Cl.
 *G06F 1/16* (2006.01)
 *H05K 5/00* (2006.01)
 *H05K 7/00* (2006.01)
(52) U.S. Cl. ............................ 361/679.38; 361/679.37
(58) Field of Classification Search . 361/679.33–679.39
 See application file for complete search history.

(56) References Cited

U.S. PATENT DOCUMENTS

| | | | | |
|---|---|---|---|---|
| 6,266,248 B1 * | 7/2001 | Hanas et al. | .................. | 361/752 |
| 6,952,341 B2 * | 10/2005 | Hidaka et al. | ............ | 361/679.32 |
| 6,952,342 B1 * | 10/2005 | Chen | ........................ | 361/679.38 |
| 7,035,096 B2 * | 4/2006 | Franz et al. | ............... | 361/679.32 |
| 7,477,511 B2 * | 1/2009 | Hsu et al. | ................. | 361/679.37 |
| 7,511,953 B2 * | 3/2009 | Tao et al. | .................. | 361/679.39 |
| RE41,514 E * | 8/2010 | Behl et al. | ................... | 312/223.1 |
| 7,864,522 B1 * | 1/2011 | Peng et al. | ............... | 361/679.33 |
| 7,974,088 B2 * | 7/2011 | Li | ............................ | 361/679.37 |
| 2005/0207108 A1 * | 9/2005 | Chen | ........................... | 361/685 |
| 2007/0159786 A1 * | 7/2007 | Liu et al. | ....................... | 361/685 |
| 2007/0211422 A1 * | 9/2007 | Liu et al. | ....................... | 361/685 |
| 2008/0204994 A1 * | 8/2008 | Wang | ............................ | 361/685 |
| 2008/0266781 A1 * | 10/2008 | Olesiewicz et al. | ........... | 361/685 |

* cited by examiner

*Primary Examiner* — Jinhee Lee
*Assistant Examiner* — Adrian S Wilson
(74) *Attorney, Agent, or Firm* — Altis Law Group, Inc.

(57) ABSTRACT

A data storage device assembly includes a rack, a mounting member, and a handle. The rack has a data storage device mounted therein. The mounting member is secured on the rack. The mounting member defines a receiving room. A clamp is slidably received in the receiving room. The clamp includes two spaced elastic claws. The handle is pivotally mounted on the mounting member. The handle includes a clasp. The handle is rotatable on the mounting member between a first position and a second position. In the first position, the clamp is located in the receiving room, the two spaced elastic claws are restricted by edges of the receiving room, and the clasp is fastened between the two elastic claws. In the second position, the clamp is located out of the receiving room, and the clasp is not fastened between the two elastic claws.

20 Claims, 7 Drawing Sheets

DATA STORAGE DEVICE ASSEMBLY

BACKGROUND

1. Technical Field

The present disclosure relates to data storage device assemblies, and more particularly, to a data storage device assembly with a handle.

2. Description of Related Art

When assembling a conventional computer, the data storage device is typically secured to a drive bracket by using a plurality of screws. A significant drawback of this means is that the insertion and removal of screws is cumbersome and time consuming. In addition, a tool such as a screwdriver is usually required. Moreover, the screws can be accidentally lost during assembly or disassembly.

More recent developments have found other means for facilitating installation and removal of a data storage device. These include the use of sliding rails. For example, a mounting apparatus that first attaches a pair of sliding rails to sides of the data storage device by using screws, then the data storage device with the sliding rails is slidably secured to a drive bracket. However, it is often hard to slide the data storage device when the sliding rails are not properly aligned with the drive bracket.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
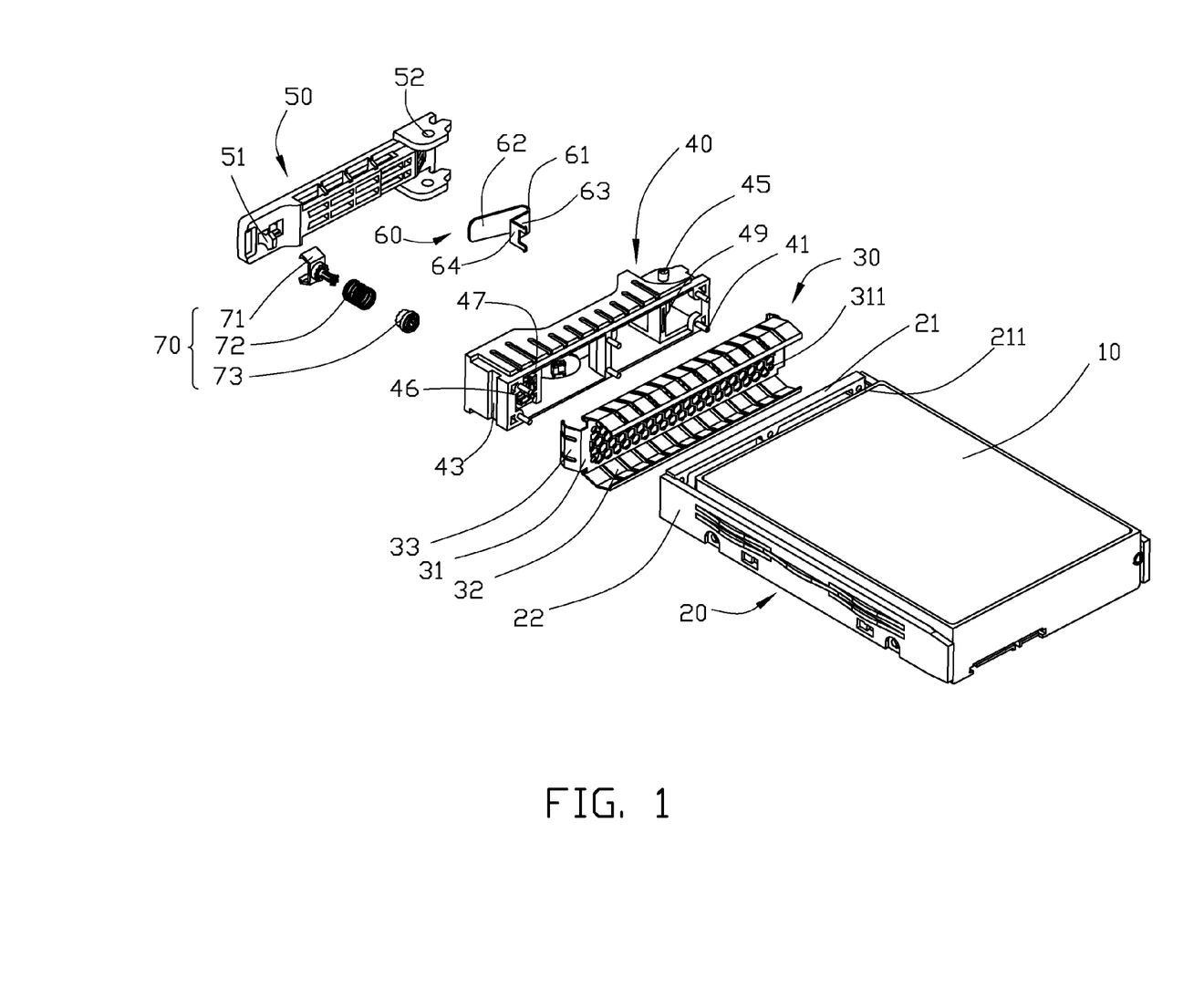
FIG. 1 is an exploded, isometric view of a data storage device assembly in one embodiment.
Figure 2:
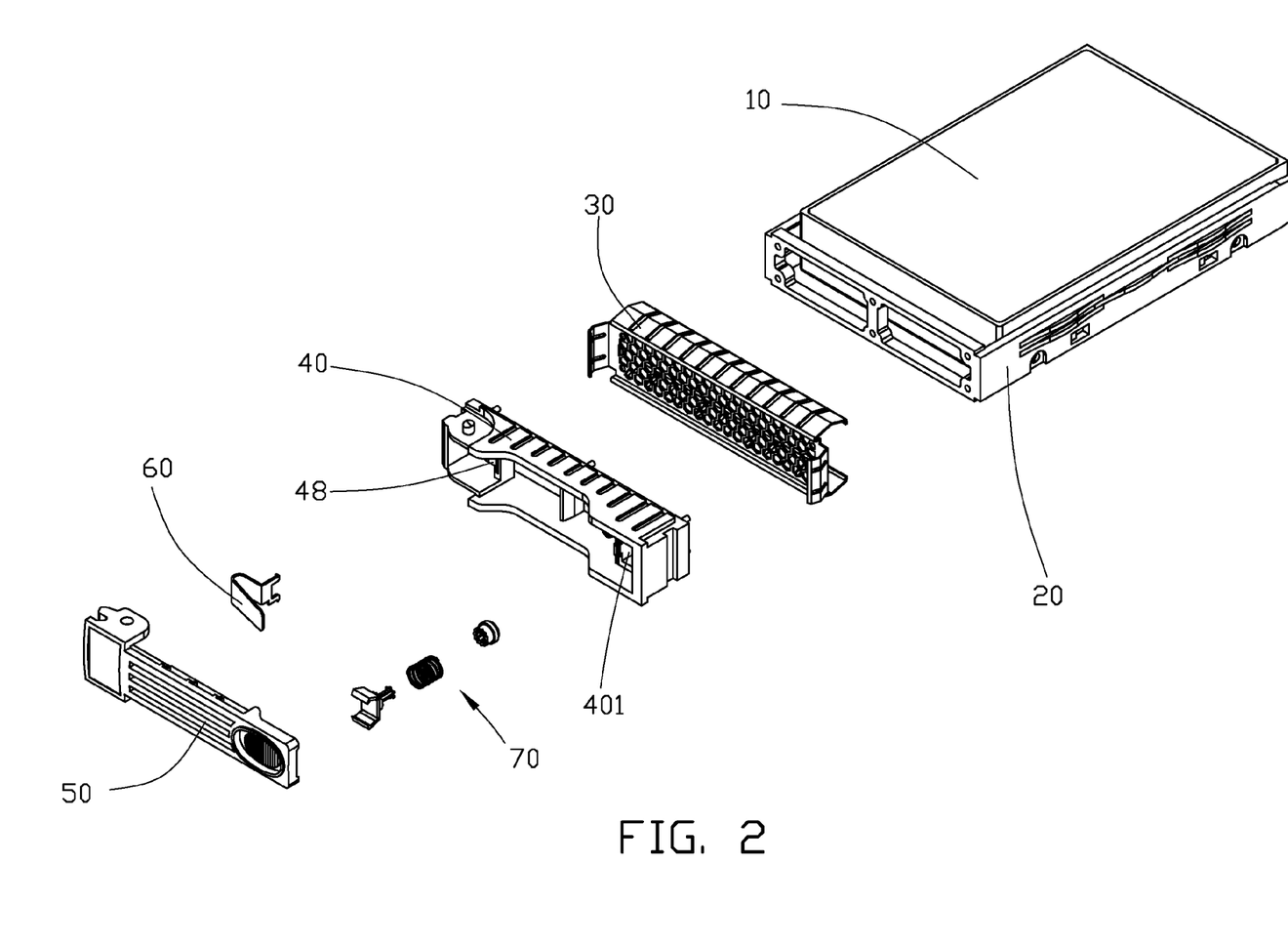
FIG. 2 is similar to FIG. 1, but viewed from another aspect.

Referring to FIGS. 1 and 2, a data storage device assembly in accordance with an embodiment includes a data storage device 10, a rack 20, an EMI shielding cover 30, a mounting member 40, a handle 50, a resilient member 60, and a locking assembly 70.

The rack 20 includes a front wall 21 and a pair of side walls 22 extending from opposite edges of the side walls 22. The data storage device 10 is secured between the pair of side walls 22. The front wall 21 defines a plurality of first fixing holes 211.

The EMI shielding cover 30 includes a main portion 31, a plurality of first fingers 32 extending from the top and bottom edges of the main portion 31, and a plurality of second fingers 33 extending from the left and right edges of the main portion 31. The first fingers 32 are capable of clasping on the front wall 21 to the mount the cover 30 on the rack 20. The main portion 31 defines a plurality of second fixing holes 311 corresponding to the first fixing holes 211.

A rear side of the mounting member 40 forms a plurality of fixing pins 41 corresponding to the first and second fixing holes 211, 311. Each of the left and right sides of the mounting member 40 defines a groove 43. The mounting member 40 forms a pair of pivot axes 45. One axis 45 is formed on a top side of the mounting member 40, and the other axis 45 (not shown) is formed on a bottom side of the mounting member 40. A mounting hole 46 is defined in one side of the mounting member 40, and a receiving room 401 is defined at the opposite side of the mounting member 40. The mounting hole 46 and the receiving room 401 communicate with each other. A plurality of hooks 47 is formed around the mounting hole 46. A support piece 48 is formed on the mounting member 40 adjacent the pivot axes 45. A slit 49 is defined in the mounting member 40 adjacent the support piece 48.

The resilient member 60 is a bent piece, and includes a first piece 62, a second piece 63, and a bent portion 61 connecting the first piece 62 with the second piece 63. A free end of the second piece 63 forms an insert portion 64.

Figure 3:
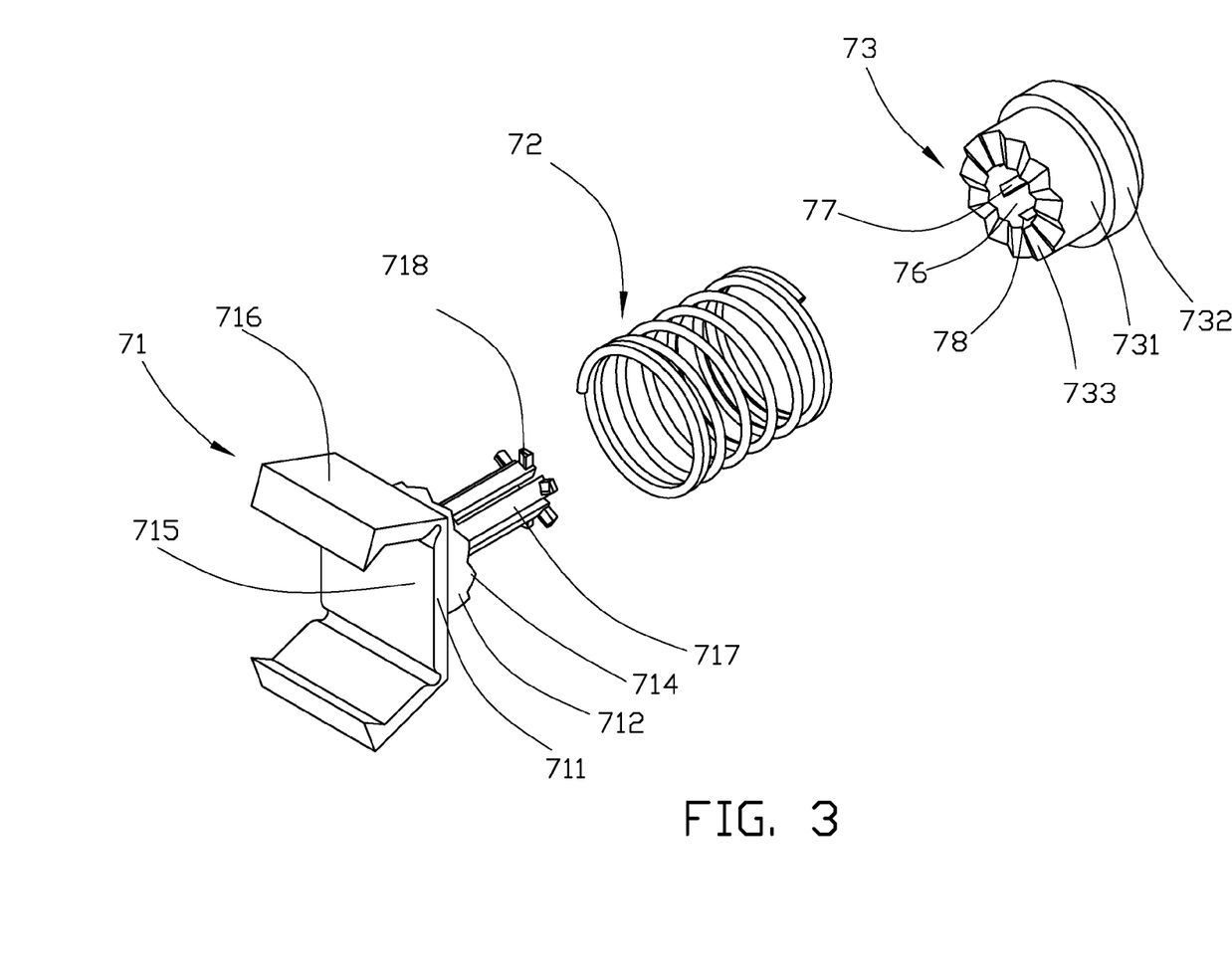
FIG. 3 is an exploded, isometric view of a locking assembly of the data storage device assembly of FIG. 1.
Figure 4:
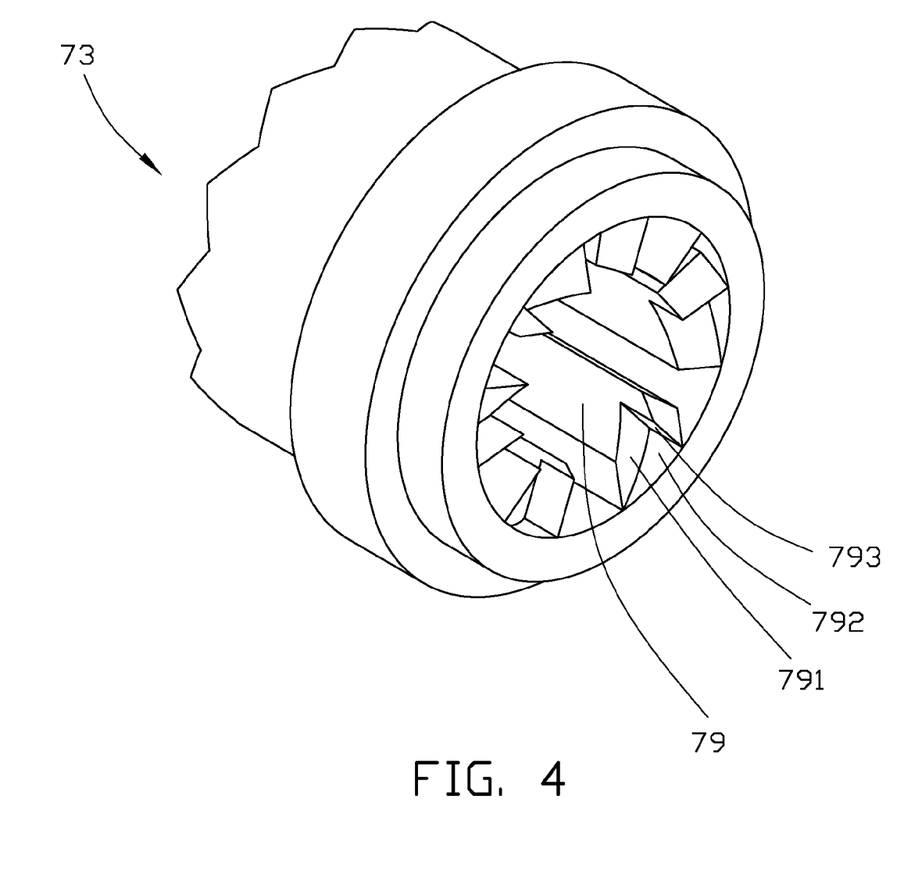
FIG. 4 is an isometric view of a driving member of the locking assembly of FIG. 3.

Referring to FIGS. 3 and 4, the locking assembly 70 includes a latch member 71, a spring 72, and a driving member 73. The latch member 71 includes a first transmission portion 712, a clamp 711 formed on one side of the first transmission portion 712, and a plurality of poles 717 formed on the other side of the first transmission portion 712. The first transmission portion 712 forms a plurality of first transmission teeth 714. The clamp 711 includes a connection piece 715 and two spaced elastic claws 716 formed on opposite edges of the connection piece 715. The two spaced elastic claws 716 are capable of being bent towards each other. A free end of each pole 717 is bent to form a slide portion 718.

The driving member 73 includes a second transmission portion 731 and a fixing portion 732. The second transmission portion 731 is thinner than the fixing portion 732. A diameter of the second transmission portion 731 is smaller than that of the mounting hole 46 of the mounting member 40. A diameter of the fixing portion 732 is greater than that of the mounting hole 46 of the mounting member 40. The second transmission portion 731 forms a plurality of second transmission teeth 733 corresponding to the first transmission teeth 714. An engaging hole 76 extends through the second transmission portion 731 and the fixing portion 732. An inner surface of the engaging hole 76 forms a plurality of protrusions 79. Two adjacent protrusions 79 define a sliding groove 77 therebetween corresponding to the slide portions 718 of the latch member 71. Each protrusion 79 includes an inclined guiding surface 791, and a stopping surface 793. The guiding surface 791 and the stopping surface 793 surround a positioning cutout 792 therebetween.

The handle 50 includes a clasp 51 corresponding to the clamp 711. The handle 50 defines a pair of pivot holes 52 corresponding to the pivot axes 45 of the mounting member 40.

Referring to FIGS. 1 to 7, in assembly of the data storage device assembly, the second transmission portion 731 of the driving member 73 is inserted in the mounting hole 46. The hooks 47 engage on the fixing portion 732 of the driving member 73. Therefore, the driving member 73 is limited to the mounting hole 46, and capable of rotating therein. The spring 72 is located around the poles 717 of the latch member 71. The poles 717 are inserted in the engaging holes 76 with the slide portions 718 sliding in the sliding grooves 77.

Figure 5:
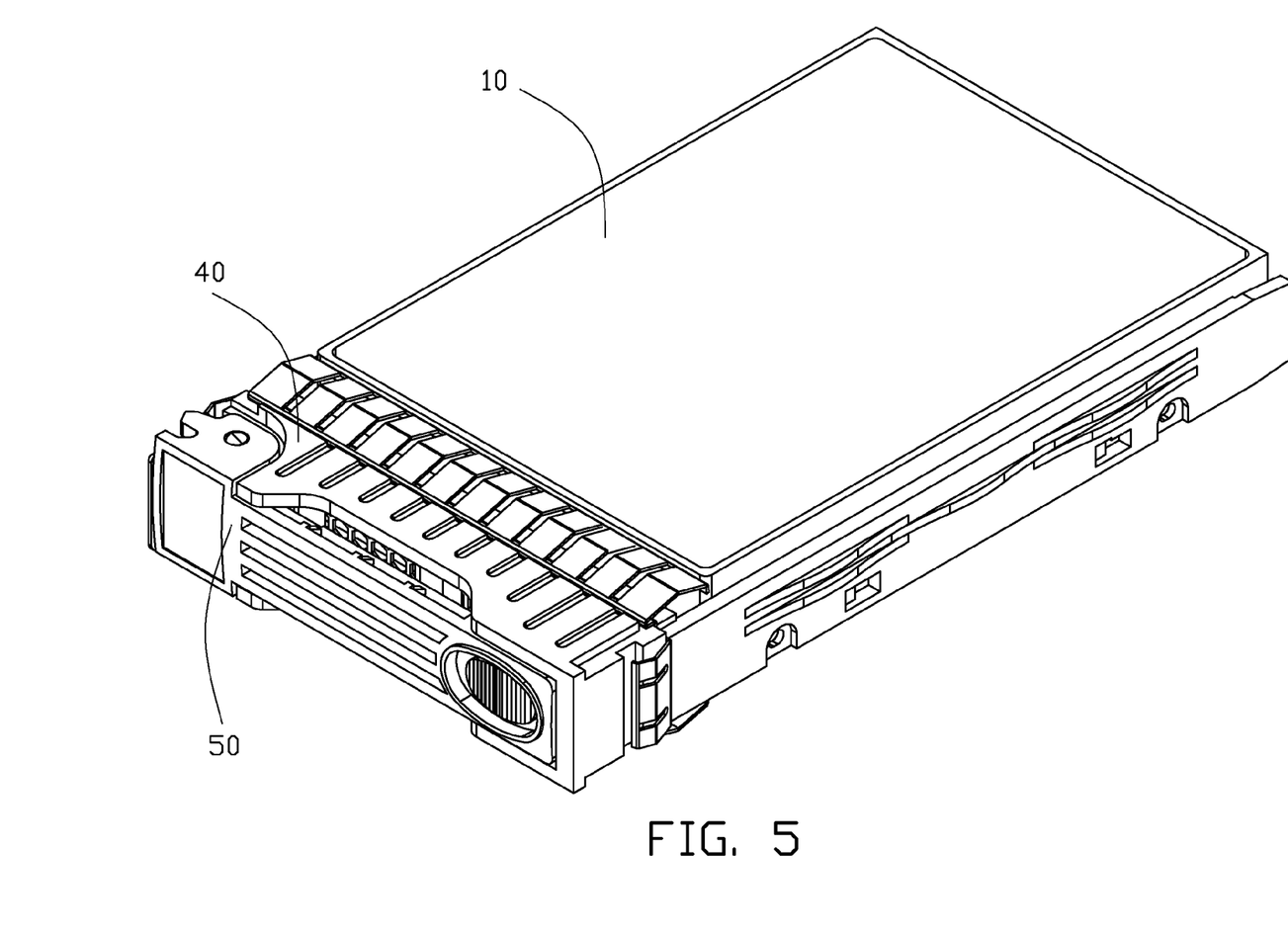
FIG. 5 is an assembly view of the data storage device assembly of FIG. 1.

The first fingers 32 of the cover 30 clasp on the front wall 21 to mount the cover 30 on the rack 20. The second fixing holes 311 are aligned with the first fixing holes 211. The fixing pins 41 are inserted in the first and second fixing holes 211 and 311. The second fingers 33 engage with the grooves 43 of the mounting member 40. Therefore, the rack 20, the cover 30, and mounting member 40 are mounted together.

The insert portion 64 of the resilient member 60 is inserted into the slit 49 of the mounting member 40. The support piece 48 supports the second piece 63 thereon. The handle 50 is located on the first piece 62. The pivot axes 45 of the mounting member 40 insert in the pivot holes 52 of the handle 50. Therefore, the handle 50 is pivotally mounted on the mounting member 40. The handle 50 rotates on the mounting member 40, and the resilient member 60 is elastically deformed. The clasp 51 of the handle 50 pushes the connection portion 715 of the latch member 71. The spring 72 is compressed. The clamp 711 moves into the receiving room 401. The claws 716 of the clamp 711 are restricted by the edges of the receiving room 401 and deformed towards each other. Therefore, the claws 716 fasten the clasp 51 therebetween. Simultaneously, the slide portions 718 slide through the sliding grooves 77. At this position, the first transmission teeth 714 engage with the second transmission teeth 733.

Figure 6:
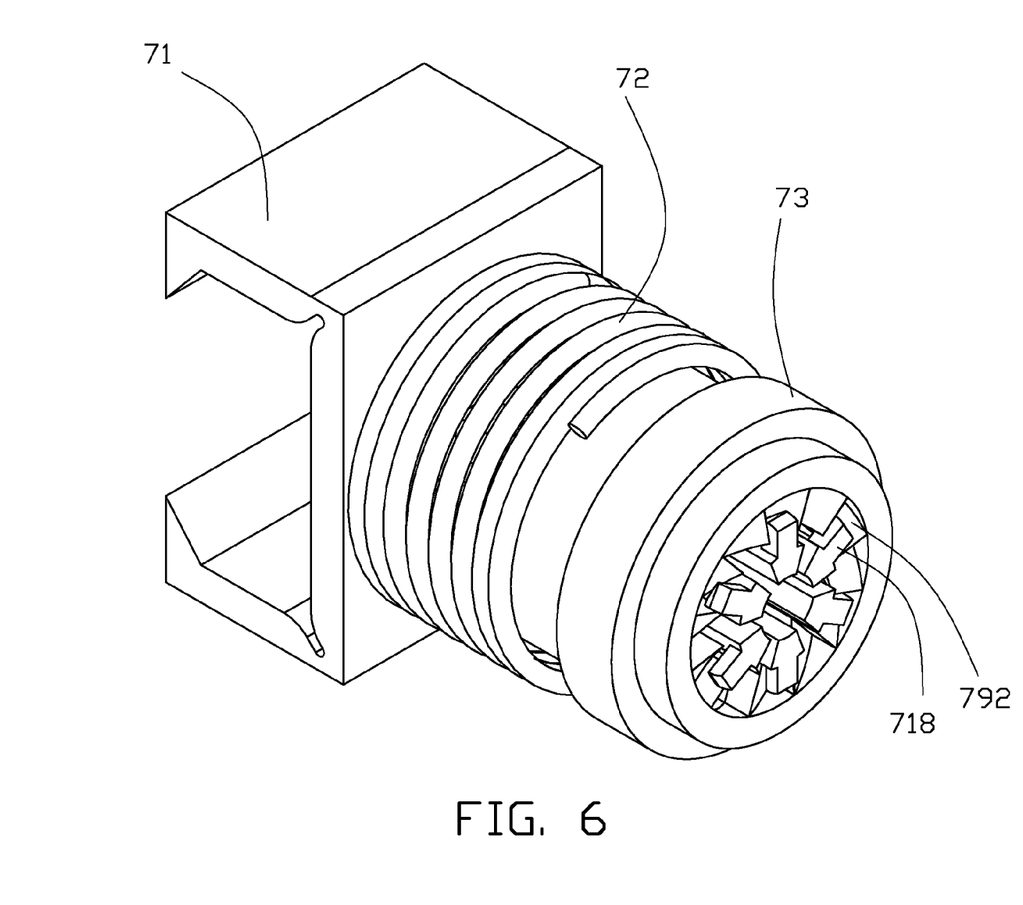
FIG. 6 is an assembly view of the locking assembly of FIG. 3.
Figure 7:
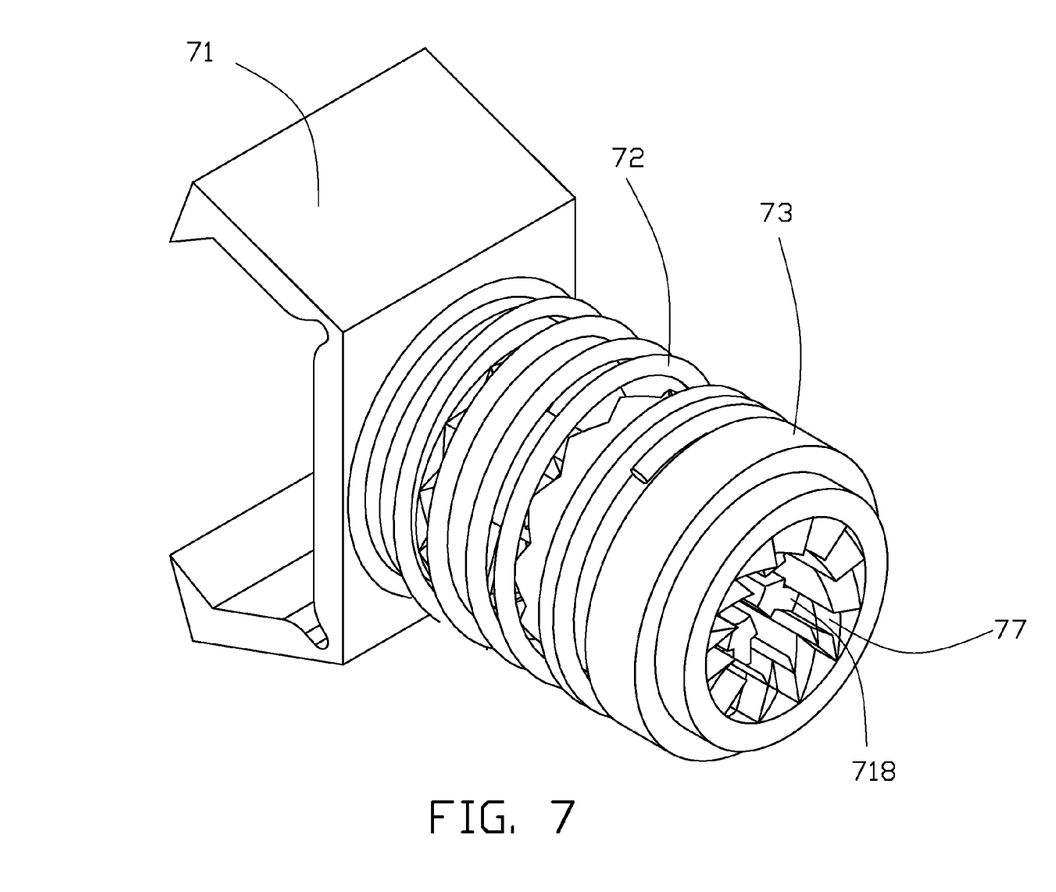
FIG. 7 is another assembly view of the locking assembly of FIG. 3.

Referring to FIGS. 1, 6, and 7, while rotating the handle 50, the first transmission teeth 714 push the second transmission teeth 733. The driving member 73 rotates in the mounting hole 46 so that the slide portions 718 are in alignment with the guiding surfaces 791 of the protrusions 79. At this time, stop rotating the handle 50. Then the latch member 71 moves towards the handle 50 under a force of the spring 72. The slide portions 718 slide on the guiding surfaces 791 to cause the driving member 73 rotating. The driving member 73 rotates until the stopping surfaces 793 block the slide portions 718. The slide portions 718 are located in the positioning cutouts 792 of the protrusions 79. Therefore, the handle 50 is secured on the mounting member 40, and locks with the mounting member 40.

When the handle 50 needs to be unlocked from the mounting member 40, the handle 50 is pressed towards to the mounting member 40. The clasp 51 pushes the latch member 71, then the sliding portions 718 of the latch member 71 move out of the positioning cutouts 792. The first transmission teeth 714 push the second transmission teeth 733 to have the driving member 73 rotate. The driving member 73 rotates until the slide portions 718 are in alignment with the sliding grooves 77. The latch member 71 then moves towards the handle 50 under the force of the spring 72. The slide portions 718 slide in the sliding grooves 77 until the slide portions 718 resist against the stop ends 78. At this position, the clamp 711 moves out of the receiving room 401. The claws 716 of the clamp 711 release the clasp 51. Then, the handle 50 rotates away the mounting member 40 under a force of the resilient member 60. Therefore, it is convenient to push the handle 50 to attach and detach the data storage device 10 on or off a drive bracket.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A data storage device assembly, comprising:
   a rack with a data storage device mounted therein;
   a mounting member secured on the rack, the mounting member defining a receiving room, a clamp slidably received in the receiving room, the clamp comprising two spaced elastic claws; and
   a handle pivotally mounted on the mounting member, the handle comprising a clasp;
   wherein the handle is rotatable on the mounting member between a first position and a second position; in the first position, the clamp is located in the receiving room, the two elastic claws are restricted by edges of the receiving room, and the clasp is fastened between the two elastic claws; in the second position, the clamp is located out of the receiving room, and the clasp is not fastened between the two elastic claws.

2. The data storage device assembly of claim 1, further comprising a driving member, wherein the driving member is rotatably mounted in the mounting member, the driving member defines an engaging hole; an inner surface of the engaging hole forms a plurality of protrusions, two adjacent protrusions define a sliding groove therebetween, each protrusion defines a positioning cutout; the clamp is formed on a latch member, the latch member comprises a plurality of slide portions sliding in the sliding grooves when the handle is located in the second position, and sliding out of the sliding grooves to be positioned in the positioning cutouts when is handle is located in the first position.

3. The data storage device assembly of claim 2, wherein the latch member comprises a plurality of first transmission teeth, the driving member comprises a plurality of second transmission teeth, the first transmission teeth are capable of pushing the second transmission to rotate the driving member when the handle rotates from the second position to the first position.

4. The data storage device assembly of claim 3, wherein each of the protrusion defines an inclined guiding surface and a stopping surface, the positioning cutout is surrounded by the guiding surface and the stopping surface, and the guiding surface guides the slide portion into contact with the stopping surface when the handle rotates from the second position to the first position.

5. The data storage device assembly of claim 2, wherein the latch member comprises a plurality of poles, a free end of each of the poles has one of the slide portions, and the poles are capable of being inserted in the engaging hole to place the slide portions in the sliding grooves.

6. The data storage device assembly of claim 5, wherein a spring is located around the poles, the spring is compressed when the handle is located in the first position, and biases the latch member to disengage the clamp from the receiving room when the handle rotates from the first position to the second position.

7. The data storage device assembly of claim 1, wherein a resilient member is mounted between the handle and the mounting member.

8. The data storage device assembly of claim 7, wherein the resilient member comprises a first piece and a second piece, the second piece is secured on the mounting member, and the resilient member is capable of being resiliently bent.

9. The data storage device assembly of claim 8, wherein a free end of the second piece comprises an insert portion thereon, the mounting member comprises a support piece, supporting the second piece thereon, and defines a slit that receives the insert portion inserted therein.

10. The data storage device assembly of claim 1, wherein the rack comprises a front wall, and the front wall defines a plurality of first fixing holes; an EMI shielding cover is mounted on the front wall, the cover defines a plurality of second fixing holes in alignment with the first fixing holes, and the cover comprises a plurality of first fingers clasped on the front wall and a plurality of second fingers clasped on the mounting member; and the mounting member comprises a plurality of fixing pins secured in the first and second fixing holes.

11. A data storage device assembly, comprising:
a rack with a data storage device mounted therein;
a mounting member secured on the rack, a driving member rotatably mounted in the mounting member, the driving member defining an engaging hole, an inner surface of the engaging hole has a plurality of protrusions, two adjacent protrusions define a sliding groove therebetween, each protrusion defines a positioning cutout;
a handle pivotally mounted on the mounting member;
an engaging assembly mounted on the mounting member and the handle, the engaging assembly comprising a plurality of slide portions;
wherein the sliding portions are slidable between a first position and a second position; in the first position, the sliding portions is located in the sliding grooves to release the engaging assembly to have the handle freely rotating on the mounting member; in the second position, the sliding portions are located in the positioning cutouts to lock the engaging assembly to secure the handle on the mounting member.

12. The data storage device assembly of claim 11, wherein the engaging assembly comprises a receiving room defined in the mounting member, a latch member, and a clasp formed on the handle; the latch member comprises a clamp that is slidably received in the receiving room, and the sliding portions are formed on the latch member; the clamp comprises two spaced elastic claws, the claws are restricted by the edges of the receiving room to fasten the clasp when the sliding portions are in the second position, and the claws are released by the receiving room to release the clasp when the sliding portions are in the first position.

13. The data storage device assembly of claim 11, wherein the engaging assembly comprises a latch member, the latch member comprises a plurality of first transmission teeth, the driving member comprises a plurality of second transmission teeth, the first transmission teeth are capable of pushing the second transmission teeth when the sliding portions slide from the first position to the second position.

14. The data storage device assembly of claim 13, wherein each of the protrusions defines an inclined guiding surface and a stopping surface, the positioning cutout is surrounded by the guiding surface and the stopping surface, and the guiding surface guides the slide portion into contact with the stopping surface when the sliding portion slides from the second position to the first position.

15. The data storage device assembly of claim 11, wherein the engaging assembly comprises a plurality of poles, a free end of each of the poles comprises of one of the slide portions, and the poles are capable of being inserted in the engaging hole to place the slide portions sliding in the sliding grooves.

16. The data storage device assembly of claim 15, wherein a spring is located around the poles, the spring is compressed when the sliding portions are in the second position, and biases the latch member to disengage the clamp from the receiving room when the sliding portions are in the first position.

17. The data storage device assembly of claim 11, wherein a resilient member is mounted between the handle and the mounting member.

18. The data storage device assembly of claim 17, wherein the resilient member comprises a first piece and a second piece, the second piece is secured on the mounting member, and the resilient member is capable of being resiliently bent.

19. The data storage device assembly of claim 18, wherein a free end of the second piece comprises an insert portion thereon, the mounting member comprises a support piece supporting the second piece thereon and defines a slit that receives the insert portion inserted therein.

20. The data storage device assembly of claim 11, wherein the rack comprises a front wall, and the front wall defines a plurality of first fixing holes; an EMI shielding cover is mounted on the front wall, the cover defines a plurality of second fixing holes in alignment with the first fixing holes, and the cover comprises a plurality of first fingers clasped on the front wall and a plurality of second fingers clasped on the mounting member; and the mounting member comprises a plurality of fixing pins secured in the first and second fixing holes.

* * * * *